Patented Dec. 28, 1926.

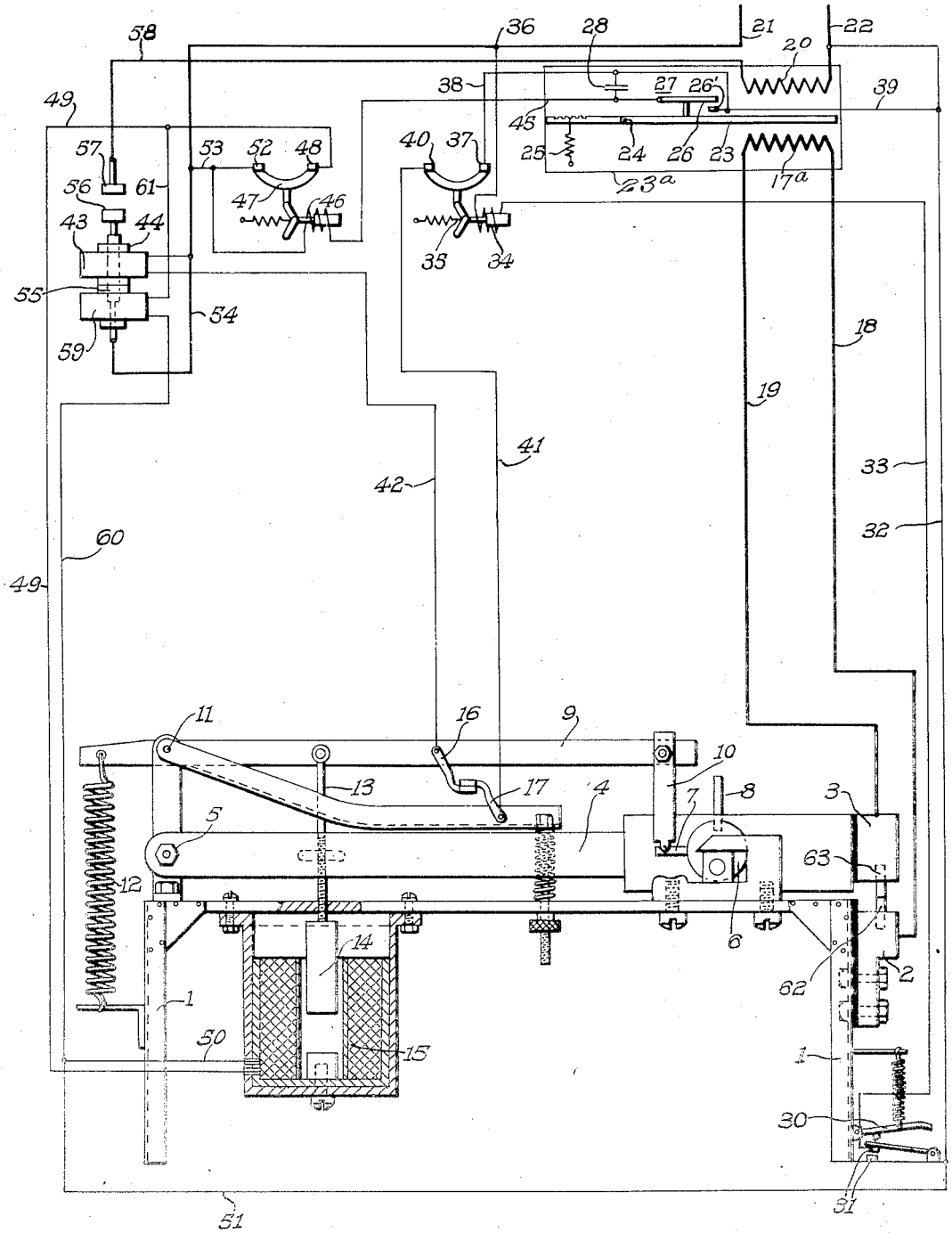

1,612,388

UNITED STATES PATENT OFFICE.

ALLIS M. MacFARLAND, OF WILKINSBURG, PENNSYLVANIA, ASSIGNOR TO WESTINGHOUSE ELECTRIC & MANUFACTURING COMPANY, A CORPORATION OF PENNSYLVANIA.

APPARATUS FOR AUTOMATIC WELDING.

Application filed December 29, 1923. Serial No. 683,400.

This invention relates to welding, more particularly to percussive welding, as set forth in the patent to L. W. Chubb, No. 1,403,292, dated January 10, 1922.

The welding system described in the patent includes a device for storing energy, such as a transformer, the secondary of which is connected to the parts to be welded, and the primary to a source of current. A control system is provided so that when the electrodes are automatically separated, an arc is formed by the discharge of stored energy from the secondary of the transformer, after which the parts to be welded are struck a sharp blow to extinguish the arc and forge the parts together.

The present invention is intended to constitute an improvement over the system described by Chubb, it being among the objects thereof to provide a welding apparatus in which there shall be complete automatic control of all the functions thereof.

It is a further object of my invention to provide a system in which the functions of the apparatus shall be performed automatically, and in response to the amount of energy stored in the transformer of the system.

In practising my invention, I provide a welding apparatus which may be of the type described by Chubb, or preferably, such as is set forth in my co-pending application, Serial No. 551,529, filed April 11, 1922, percussive welding machine. In both cases, the parts to be welded are electrically connected to the secondary of a transformer, and I provide a magnetizable member so arranged with respect to the core of the transformer, that upon the storing of a predetermined amount of energy in the transformer, the magnetizable member is actuated to initiate the various functions of the device.

In the accompanying drawing, constituting a part hereof, and in which like reference characters designate like parts, the single figure is an elevational view of a welding apparatus showing diagrammatically the electrical connections therefor.

The apparatus consists of a base 1, having a chuck member or holder 2 secured thereto but electrically insulated therefrom. A chuck member or holder 3 is secured in a similar manner to an arm 4 pivoted to the base at point 5, and in alinement with chuck 2. Mounted in the arm 4 is an eccentric 6, having a projecting portion 7 and a handle 8 thereon and pivoted to a portion of base 1. An arm 9, having a hammer 10 and pivoted at 11, is adapted to strike the projecting portion 7 to move the eccentric 6. A spring 12 tends to normally hold the arm 9 in retracted position.

Depending from an intermediate portion of arm 9 is a rod 13, having a magnetizable core 14 on the free end thereof, operating within the solenoid 15 secured to the base 1. A pair of contacts 16 and 17 are secured to the arm 9 and the base of the machine, respectively, as shown.

The secondary 17a of a transformer is connected by leads 18 and 19 to chucks 2 and 3, respectively. The primary 20 thereof is suitably connected to lines 21 and 22 of the primary circuit, which supplies the energy for operating the apparatus. A magnetizable armature 23, preferably in the form of a bar of soft iron, is pivoted to the transformer casing 23a at 24 and is biased to its inoperative position by an adjustable spring 25. The bar 23 carries one of the contact members 26 26' of a switch 27, across which is connected a condenser 28 which serves the purpose of breaking an arc which may form between the contacts.

A foot-operated switch 30, having contact members 31, is provided in the base 1 of the apparatus. A lead 32 connects one of the contacts with the line 22 of the primary circuit. Lead 33, secured to the other contact 31, is connected to the closing coil 34 of a circuit breaker 35, the other side of the coil being connected to line 21 at point 36. One contact, 37, of circuit breaker 35, is connected to the line 22 of the primary circuit through leads 38 and 39. The other contact, 40, of the circuit breaker 35, is connected by lead 41 to contact 17, on the base of the welding apparatus. The cooperating contact 16 is connected by lead 42 to the closing coil 43 of the main switch 44 for energizing the primary winding of the transformer, the other side of the coil 43 being connected to line 21.

The contact member 26 of switch 27, is connected by lead 45, to the closing coil 46 of the circuit breaker 47, one contact 48 of which is connected to one side of solenoid 15 through lead 49. The other side of solenoid 15 is connected by leads 50, 51 and 32, line 22 of the primary circuit.

The other contact 52 of circuit breaker 47, is connected by leads 53 and 54, the core of the main switch 44, the contacts 56 and 57 thereof and lead 58, to the primary 20 of the transformer. The main switch 44 is provided with a tripping coil 59 which is connected by leads 60 and 51, to line 22, and by the lead 61 through the circuit breaker 47 to the line 21.

The operation of the device is as follows. The parts to be welded, 62 and 63, which may be of any suitable form and of any desired metal or metals, are secured in chucks 2 and 3 in alinement and in contact with each other. The foot-operated switch 30 is then depressed, closing a circuit from line 22 through the contacts 31, through coil 34, closing circuit breaker 35, and causing a current to flow through the contact members 37 and 40 thereof, contact members 17 and 16, and energizing coil 43 of switch 44. This causes the plunger of said switch to move upwardly, closing contact members 56 and 57 thereof, and causing energy to flow in the primary 20 of the transformer.

When the transformer has stored up a sufficient amount of energy, the magnetic field produced, acting on the armature 23, draws the same over until the contact members 26 and 26' of switch 27 are closed. This causes current to flow from line 22 through leads 39 and 45, energizing coil 46 of the circuit breaker 47. The circuit breaker thereupon closes, and a circuit is established from line 22 through leads 32, 51 and 50, to solenoid 15, thence through leads 49 and 53 to line 21. At the same time, coil 59 of switch 44 is energized and, since it is wound in opposition to coil 43, but is slightly smaller than the same, it tends to overcome the effect thereof and tends to break the circuit through contact members 56 and 57. However, since the force of coil 43 is slightly greater than that of 59, the circuit is not broken.

The energization of the solenoid 15 actuates the plunger 14, causing the arm 9 to move downwardly. The downward movement of arm 9 separates the contact members 16 and 17, de-energizing coil 43 and allowing coil 59 to retract the plunger of switch 44, thereby breaking the circuit through the primary coil 20 of the transformer.

The collapse of the magnetic field in the iron of the transformer sets up a heavy flow of current through the secondary 17 of the transformer and through the pieces 62 and 63 to be welded, said pieces being still in contact. As the arm 9 continues its downward motion, the hammer 10 strikes upon projecting portion 7 of eccentric 6, causing first a slight separation of chucks 2 and 3 by an upward movement of arm 4, thereby establishing an arc between the members 62 and 63 to be welded. A further movement of the eccentric by the hammer, forces the parts to be welded together with a sharp blow or percussive engagement, extinguishing the arc and forging the parts together.

When the energy of the transformer has been dissipated in the welding operation, the armature 23 is released, and is caused to assume the position shown in the drawing, by the action of spring 25, thereby breaking the circuit through the circuit breaker 47 and deenergizing the solenoid 15. The hammer arm 9 is now raised to make the contact 16—17 by the action of spring 12, the foot switch 30 having previously been released to prevent a reclosure of the main switch 44. The welded parts may now be removed from the chucks, other parts inserted, and the eccentric 6 moved to its operative position by means of the handle 8. The apparatus is now in position for another welding operation.

It will be noted that, in order to operate the apparatus, it is merely necessary to close the contact members 31 of foot switch 30, whereupon all the functions of the apparatus are performed automatically in a properly timed sequence. The sequence of operation is very short, the entire time consumed between the closing of the foot switch and the forging of the electrodes being a matter of fractions of a second or a few seconds at the most. Most of the time required for the automatic operation is consumed by the storing of energy in the transformer. The welding operation itself, requires a very small fraction of a second at the most. It will be obvious that if a larger transformer is used, or if a smaller amount of energy is to be stored therein for welding the parts together, the time necessary for the completion of the cycle may thereby be materially reduced.

Although I have described my invention setting forth a specific embodiment thereof, various changes may be made in the apparatus and the electrical connections within the scope thereof. The character of the switches used and the relative arrangement of the parts may be varied to suit the specific operating conditions for the apparatus, as is well known to the electrical engineer. Although I have shown and described an armature 23 pivoted to the core of the transformer and biased by a spring 25, which is adjustable to vary the tension thereof, I may provide other means for varying the amount of energy necessary to move the armature 23 to close the contacts of switch 27. For instance, I may place the armature at varying distances from the transformer core, and thus obtain the same result. These and other changes may be made in my invention within the scope thereof.

I claim as my invention:—

1. In a welding apparatus embodying a device for storing energy, means responsive to the amount of energy in said device for breaking the circuit of the source of said energy.

2. In a welding apparatus embodying a device for storing energy, means secured to said device and responsive to the amount of energy therein for breaking the circuit of the source of said energy.

3. In a welding apparatus embodying a device for storing energy, means responsive to the magnetization of said device for breaking the circuit of the source of said energy.

4. In a welding apparatus embodying a device for storing energy, means comprising a magnetizable member responsive to the degree of magnetization of said device for breaking the circuit of the source of said energy.

5. In a welding apparatus embodying a transformer device for storing energy, means comprising a magnetizable member responsive to the degree of magnetization of said device for breaking the circuit of the source of said energy.

6. In a welding apparatus embodying a device for storing energy, means comprising a biased magnetizable member responsive to the degree of magnetization of said device for breaking the circuit of the source of said energy.

7. In a welding apparatus embodying a device for storing energy, means comprising a biased pivotal magnetizable member responsive to the amount of magnetization of said device for breaking the circuit of the source of said energy.

8. In a welding apparatus embodying a device for storing energy, means comprising an adjustable magnetizable member responsive to the degree of magnetization of said device for breaking the circuit of the source of said energy.

9. In a welding apparatus embodying a device for storing energy, means comprising a magnetizable member responsive to varying degrees of magnetization of said device for breaking the circuit of the source of said energy.

10. A welding apparatus comprising a plurality of relatively movable holders for the parts to be welded, a device for storing energy connected to said holders, and means responsive to the amount of energy in said device for operating said apparatus.

11. A welding apparatus comprising a plurality of relatively movable holders for the parts to be welded, a device for storing energy connected to said holders and means responsive to the amount of energy in said device for causing energy to flow in the welding circuit.

12. A welding apparatus comprising a plurality of relatively movable holders for the parts to be welded, a device for storing energy connected to said holders and means responsive to the amount of energy in said device for causing energy to flow in the welding circuit and causing percussive engagement of said parts.

13. In a welding apparatus comprising a device for storing energy, means responsive to the amount of energy stored for translating the stored energy into welding heat when the amount of the stored energy shall have reached a certain predetermined value.

14. In an electric welding apparatus, means for storing a predetermined amount of energy, and means responsive to the amount of energy stored for utilizing said fixed amount of energy in a welding operation.

15. An automatic welding machine comprising means for engaging a pair of electrodes, at least one of said electrode-engaging means being movable, an electric supply circuit, a transformer having a primary winding and a secondary winding, circuit connections including a main circuit breaker for connecting said primary winding to said supply circuit, circuit connections for connecting said electrode-engaging means to said secondary winding, a controlling means adapted to be actuated by the operator for setting the machine in motion, means actuated by said controlling means for closing said main circuit breaker, an electro-responsive device for actuating an auxiliary contact after an appropriate time interval after the closure of said main circuit breaker, a moving mechanism for moving one of said electrode-engaging means, means responsive to the actuation of said auxiliary contact for setting in motion said moving mechanism, and means operable at a predetermined point in the movement of said moving mechanism for opening the circuit of said primary winding.

16. An automatic welding machine comprising means for engaging a pair of electrodes, at least one of said electrode-engaging means being movable, a moving mechanism adapted by its movement to separate the electrodes and subsequently bring the same together, an electric supply circuit, a transformer having a primary winding and a secondary winding, circuit connections including a main circuit breaker for connecting said primary winding to said supply circuit, circuit connections for connecting said electrode-engaging means to said secondary winding, a controlling means adapted to be actuated by the operator for setting the machine in motion, means actuated by said controlling means for closing said main circuit breaker, an electro-responsive device for actuating an auxiliary contact after an appropriate time interval after the closure of said main circuit breaker, and means responsive to the actuation of said auxiliary contact for opening the primary circuit to cause the electromagnetically stored energy to discharge in the secondary circuit and setting in motion said moving mechanism to strike an arc between the electrodes and subsequently forge the same.

17. An automatic welding machine comprising means for engaging a pair of electrodes, at least one of said electrode-engaging means being movable, a moving mechanism adapted by its movement to strike an arc between the electrodes and subsequently forge the same, an electric supply circuit, a transformer having a primary winding and a secondary winding, circuit connections including a main circuit breaker for connecting said primary winding to said supply circuit, circuit connections for connecting said electrode-engaging means to said secondary winding, a controlling means adapted to be actuated by the operator for setting the machine in motion, said controlling means comprising means for closing said main circuit breaker, an electric energy responsive device for actuating an auxiliary contact after an appropriate time interval after the closure of said main circuit breaker, and means responsive to the actuation of said auxiliary contact for setting in motion said moving mechanism and effecting the opening of the primary circuit.

18. An automatic welding apparatus comprising means for engaging a pair of electrodes, an electric supply circuit, a transformer having a primary winding and a secondary winding, circuit connections including a main circuit breaker for connecting said primary winding to said supply circuit, circuit connections for connecting said electrode-engaging means to said secondary winding, a controlling means adapted to be actuated by the operator for setting the apparatus in operation, said controlling means comprising means for closing said main circuit breaker, and an electro-responsive means for opening the primary circuit after an appropriate time interval after the closure of said main circuit breaker.

19. An automatic welding machine comprising means for engaging a pair of electrodes, an electric supply circuit, a transformer having a primary winding and a secondary winding, circuit connections including a main circuit breaker for connecting said primary winding to said supply circuit, circuit connections for connecting said electrode-engaging means to said secondary winding, a controlling means adapted to be actuated by the operator for setting the machine in motion, means responsive to said controlling means for closing said main circuit breaker, and an electric energy responsive means for opening the primary circuit after an appropriate time interval after the closure of said main circuit breaker.

20. An automatic welding machine comprising means for engaging a pair of electrodes, at least one of said electrode-engaging means being movable, a moving mechanism for moving one of said electrode-engaging means, an electric supply circuit, a transformer having a primary winding and a secondary winding, circuit connections including a main circuit breaker for connecting said primary winding to said supply circuit, circuit connections for connecting said electrode-engaging means to said secondary winding, a controlling means adapted to be actuated by the operator for setting the machine in motion, means responsive to said controlling means for closing said main circuit breaker, and means responsive to the quantity of energy electromagnetically stored in said transformer for opening the primary circuit to cause the electromagnetically stored energy to discharge in the secondary circuit and setting in motion said moving mechanism to strike an arc between the electrodes and subsequently forge the same.

21. An automatic welding machine comprising means for engaging a pair of electrodes, an electric supply circuit, a transformer having a primary winding and a secondary winding, circuit connections including a main circuit breaker for connecting said primary winding to said supply circuit, circuit connections for connecting said electrode-engaging means to said secondary winding, a controlling means adapted to be actuated by the operator for setting the machine in motion, means responsive to said controlling means for closing said main circuit breaker, and means responsive to the quantity of energy electromagnetically stored in said transformer for opening the primary circuit.

22. An automatic welding machine comprising means for engaging a pair of electrodes, an electric supply circuit, a reactance device, circuit connections including a main circuit breaker for connecting said reactance device to said supply circuit, a controlling means adapted to be actuated by the operator for setting the machine in motion, said controlling means comprising means for closing said main circuit breaker, means responsive to the intensity of the field in said reactance device for effecting the opening of the supply circuit, and means for utilizing the energy given up by the collapse of the field in said reactance device to effect the welding of said electrodes.

23. An automatic welding machine comprising means for engaging a pair of electrodes, an electric supply circuit, a transformer, circuit connections including a main circuit breaker for connecting said transformer to said supply circuit, a controlling means adapted to be actuated by the operator for setting the machine in motion, said controlling means comprising means for closing said main circuit breaker, means responsive to the intensity of the field in said transformer for effecting the opening of the supply circuit, and means for utilizing the energy given up by the collapse of the field in said transformer to effect the welding of said electrodes.

24. An automatic welding machine comprising means for engaging a pair of electrodes, a transformer having a primary winding and a secondary winding, a controlling means adapted to be actuated by the operator for setting the machine in motion, said controlling means comprising means for energizing said primary winding, a movable armature associated with said transformer for responding to a predetermined field intensity therein, means actuated by said armature for opening the primary circuit of said transformer, and means for utilizing the energy transferred to the secondary winding by the collapse of the field in said transformer to effect the welding of said electrodes.

25. An automatic welding machine comprising means for engaging a pair of electrodes, a transformer having a primary winding and a secondary winding, a controlling means adapted to be actuated by the operator for setting the machine in motion, means responsive to said controlling means for energizing said primary winding, a biased magnetizable bar pivoted to the transformer casing for effecting the opening of the primary circuit of said transformer, and means for utilizing the energy transferred to the secondary winding by the collapse of the field in said transformer to effect the welding of said electrodes.

26. A device comprising the combination of an electric supply circuit, a transformer having a primary winding and a secondary winding, circuit connections for connecting said primary winding to said supply circuit, and means responsive to the quantity of energy electromagnetically stored in said transformer for effecting the opening of the supply circuit.

27. Means for actuating a contact device comprising the combination with said contact device, of an operating magnet therefor, an electric supply circuit, a transformer having a primary winding and a secondary winding, circuit connections for connecting said primary winding to said supply circuit, and means responsive to the energy stored in said transformer for energizing or deenergizing said operating magnet.

28. A device comprising the combination of an electric supply circuit, a reactance device, circuit connections for connecting said reactance device to said supply circuit, means responsive to the intensity of the field in said reactance device for effecting the opening of the supply circuit, and a secondary circuit associated with said reactance device for utilizing the energy stored therein.

29. A device comprising the combination of an electric supply circuit, a transformer, circuit connections including a main circuit breaker for connecting said transformer to said supply circuit, and means responsive to the intensity of the field in said transformer for effecting the opening of said circuit breaker.

30. A device comprising the combination of a transformer having a primary winding and a secondary winding, means for energizing said primary winding, a movable armature associated with said transformer for responding to a predetermined field intensity therein, and means actuated by said armature for opening the primary circuit of said transformer.

31. A device comprising the combination of a transformer having a primary winding and a secondary winding, means for energizing said primary winding, a contact device associated with said energizing means, and a biased magnetizable bar pivoted to the transformer casing for actuating said contact device.

32. A device comprising the combination of a transformer, means for energizing said transformer, an auxiliary circuit associated with said transformer, a contact device in said auxiliary circuit and a biased magnetizable bar movably supported on the transformer casing for actuating said contact device in response to the magnetic flux in said casing.

In testimony whereof, I have hereunto subscribed my name this 26th day of December 1923.

ALLIS M. MacFARLAND.